(12) United States Patent
Wimmer et al.

(10) Patent No.: US 9,384,403 B2
(45) Date of Patent: Jul. 5, 2016

(54) SYSTEM AND METHOD FOR SUPERIMPOSED HANDWRITING RECOGNITION TECHNOLOGY

(71) Applicant: MyScript, Nantes (FR)

(72) Inventors: Zsolt Wimmer, Nantes (FR); Freddy Perraud, Nantes (FR); Pierre-Michel Lallican, Nantes (FR); Guillermo Aradilla, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 14/796,092

(22) Filed: Jul. 10, 2015

(65) Prior Publication Data

US 2015/0356360 A1    Dec. 10, 2015

Related U.S. Application Data

(63) Continuation-in-part of application No. 14/245,601, filed on Apr. 4, 2014.

(30) Foreign Application Priority Data

Mar. 30, 2015  (WO) ................. PCT/IB2015/000563
May 15, 2015  (EP) ..................................... 15290129

(51) Int. Cl.
*G06K 9/00*    (2006.01)
*G06F 3/0488*    (2013.01)
(Continued)

(52) U.S. Cl.
CPC ........ *G06K 9/00865* (2013.01); *G06F 3/03545* (2013.01); *G06F 3/044* (2013.01); *G06F 3/04883* (2013.01); *G06K 9/00402* (2013.01);
(Continued)

(58) Field of Classification Search
None
See application file for complete search history.

(56) References Cited

U.S. PATENT DOCUMENTS

| 5,164,996 | A | 11/1992 | Pastor |
| 5,454,046 | A | 9/1995 | Carman, II |

(Continued)

FOREIGN PATENT DOCUMENTS

| EP | 1030263 | 5/2004 |
| EP | 1519300 | 7/2009 |

(Continued)

OTHER PUBLICATIONS

Senior et al., "An Off-Line Cursive Handwriting Recognition System", IEEE Transactions on Pattern Analysis and Machine Intelligence, IEEE Computer Society, USA, vol. 20, No. 3, pp. 309-321 Mar. 1, 1998.

(Continued)

*Primary Examiner* — Hadi Akhavannik
(74) *Attorney, Agent, or Firm* — McDermott Will & Emery LLP

(57) ABSTRACT

A system and method that is able to recognize a user's natural superimposed handwriting without any explicit separation between characters. The system and method is able to process single-stroke and multi-stroke characters. It can also process cursive handwriting. Further, the method and system can determine the boundaries of input words either by the use of a specific user input gesture or by detecting the word boundaries based on language characteristics and properties. The system and method analyzes the handwriting input through the processes of fragmentation, segmentation, character recognition, and language modeling. At least some of these processes occur concurrently through the use of dynamic programming.

10 Claims, 9 Drawing Sheets

(51) Int. Cl.
*G06F 3/044* (2006.01)
*G06F 3/0354* (2013.01)
*G06K 9/22* (2006.01)
*G06K 9/52* (2006.01)
*G06K 9/62* (2006.01)
*G06K 9/66* (2006.01)
*G06K 9/72* (2006.01)

(52) U.S. Cl.
CPC ........ *G06K 9/222* (2013.01); *G06K 9/52* (2013.01); *G06K 9/6267* (2013.01); *G06K 9/66* (2013.01); *G06K 9/723* (2013.01); *G06F 2203/04106* (2013.01); *G06F 2203/04108* (2013.01); *G06K 2209/01* (2013.01)

(56) References Cited

U.S. PATENT DOCUMENTS

| | | |
|---|---|---|
| 5,544,265 A | 8/1996 | Bozinovic et al. |
| 5,596,656 A | 1/1997 | Goldberg |
| 6,198,846 B1 | 3/2001 | Nishiwaki |
| 6,233,351 B1 | 5/2001 | Feeney et al. |
| 6,292,190 B1 | 9/2001 | Corn |
| 6,295,372 B1 | 9/2001 | Hawkins et al. |
| 6,411,732 B1 | 6/2002 | Saund |
| 6,459,442 B1 | 10/2002 | Edwards et al. |
| 6,476,834 B1 | 11/2002 | Doval et al. |
| 6,535,619 B1 | 3/2003 | Suwa et al. |
| 6,594,390 B2 | 7/2003 | Frink et al. |
| 6,609,093 B1 | 8/2003 | Gopinath et al. |
| 6,731,803 B1 | 5/2004 | Aharonson et al. |
| 6,999,616 B2 | 2/2006 | Nacken |
| 7,177,473 B2 | 2/2007 | Aharonson |
| 7,200,591 B2 | 4/2007 | Silverbrook et al. |
| 7,266,769 B2 | 9/2007 | Thacker |
| 7,324,691 B2 | 1/2008 | Li et al. |
| 7,352,902 B2 | 4/2008 | Li et al. |
| 7,372,993 B2 | 5/2008 | Lagardere et al. |
| 7,385,595 B2 | 6/2008 | Bryborn et al. |
| 7,639,250 B2 | 12/2009 | Xu et al. |
| 7,738,744 B2 | 6/2010 | Silverbrook et al. |
| 7,859,699 B2 | 12/2010 | Silverbrook et al. |
| 7,885,464 B2 | 2/2011 | Kawamura et al. |
| 7,907,141 B2 | 3/2011 | Saund |
| 7,945,097 B2 | 5/2011 | Biswas et al. |
| 7,952,614 B2 | 5/2011 | Lee |
| 8,094,939 B2 | 1/2012 | Zhang et al. |
| 8,094,941 B1 | 1/2012 | Rowley et al. |
| 8,094,942 B1 | 1/2012 | Rowley et al. |
| 8,102,383 B2 | 1/2012 | Cohen et al. |
| 8,116,569 B2 | 2/2012 | Markiewicz et al. |
| 8,159,501 B2 | 4/2012 | Rao |
| 8,175,389 B2 | 5/2012 | Matic et al. |
| 8,255,822 B2 | 8/2012 | Markiewicz et al. |
| 8,270,722 B2 | 9/2012 | Ito et al. |
| 8,310,461 B2 | 11/2012 | Morwing et al. |
| 8,331,671 B2 | 12/2012 | Dai |
| 8,341,556 B2 | 12/2012 | Madhvanath et al. |
| 8,363,949 B2 | 1/2013 | Rowley et al. |
| 8,538,156 B2 | 9/2013 | Yamanouchi |
| 8,564,620 B2 | 10/2013 | Bellamy et al. |
| 8,670,623 B2 | 3/2014 | Oota |
| 8,718,375 B2 | 5/2014 | Ouyang et al. |
| 9,142,056 B1 * | 9/2015 | Baran .................... G06T 15/00 |
| 2005/0175241 A1 | 8/2005 | Napper |
| 2007/0140561 A1 | 6/2007 | Abdulkader et al. |
| 2008/0198146 A1 | 8/2008 | Bryborn et al. |
| 2008/0288896 A1 * | 11/2008 | Madhvanath ....... G06F 3/04883 715/863 |
| 2008/0292190 A1 * | 11/2008 | Biswas ............. G06K 9/00402 382/187 |
| 2009/0278848 A1 | 11/2009 | Robertson et al. |
| 2010/0100866 A1 | 4/2010 | Kamper et al. |
| 2010/0149109 A1 | 6/2010 | Elias |
| 2010/0251188 A1 | 9/2010 | Fu et al. |
| 2011/0185272 A1 | 7/2011 | Rajkumar |
| 2011/0279455 A1 | 11/2011 | McDaniel |
| 2011/0285634 A1 | 11/2011 | Lim et al. |
| 2011/0293181 A1 | 12/2011 | Napper |
| 2012/0051594 A1 | 3/2012 | Kim et al. |
| 2012/0176416 A1 | 7/2012 | Dondurur et al. |
| 2012/0221938 A1 | 8/2012 | Patterson et al. |
| 2013/0034303 A1 | 2/2013 | Morwing et al. |
| 2013/0089257 A1 | 4/2013 | Kim et al. |
| 2013/0162553 A1 | 6/2013 | Rowley et al. |

FOREIGN PATENT DOCUMENTS

| | | |
|---|---|---|
| EP | 1454225 | 1/2013 |
| WO | 2012115853 | 8/2012 |
| WO | 2014046302 | 3/2014 |

OTHER PUBLICATIONS

Shimodaira et al., "On-line Overlaid-Handwriting Recognition Based on Substroke HMMs", Proceedings of the Seventh International Conference on Document Analysis and Recognition, pp. 1043-1047, Aug. 3, 2003.
Wan et al., "On-line Chinese Character Recognition System for Overlapping Samples", International Conference on Document Analysis and Recognition, pp. 799-803, Sep. 1, 2011.
Lv et al., "Learning-Based Candidate Segmentation Scoring for Real-Time Recognition of Online Overlaid Chinese Handwriting", 12th International Conference on Document Analysis and Recognition, pp. 74-78, Aug. 25, 2013.
International Search Report issued for PCT/IB2015/000563 mailed Sep. 21, 2015 (3 pages).
Written Opinion of the International Searching Authority issued for PCT/IB2015/000563 mailed Sep. 21, 2015 (6 pages).
Yojiro Tonouchi, Akinori Kawamura; Text Input System using Online Overlapped Handwriting Recognition for Mobile Devices.
Hiroshi Shimodaira, Takashi Sudo, Mitsuru Nakai, and Shigeki Sagayama; On-line Overlaid-Handwriting Recognition Based on Substroke HMMS, pp. 1-5.
Takeo Igarashi, Satoshi Matsuoka, Sachiko Kawachiya, Hidehiko; Interactive Beautification: A Technique for Rapid Geometric Design, pp. 1-10.
Salman Cheema, Sumit Gulawani, Joseph J. LaViola Jr.; QuickDraw: Improving Drawing Experience for Geometric Diagrams.

* cited by examiner

SYSTEM AND METHOD FOR SUPERIMPOSED HANDWRITING RECOGNITION TECHNOLOGY

CROSS-REFERENCE TO RELATED APPLICATION

This application is a Continuation-in-Part of U.S. application Ser. No. 14/245,601 filed on Apr. 4, 2014 and claims priority to International Application No. PCT/IB2015/000563 filed on Mar. 30, 2015 and European Application No. 15290129.4 filed on May 15, 2015, the entire contents of which are incorporated by reference herein.

TECHNICAL FIELD

The present invention relates generally to the field of computing device interfaces capable of recognizing user input handwriting of various characters.

BACKGROUND

Computing devices continue to become more ubiquitous to daily life. They take the form of computer desktops, laptops, tablet PCs, e-book readers, mobile phones, smartphones, wearable computers, global positioning system (GPS) units, enterprise digital assistants (EDAs), personal digital assistants (PDAs), game consoles, and the like. Further, computing devices are being incorporated into cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. Either of these methods of input can be used generally for drawing or inputting text. When a user input is text, the computing device must interpret the user's handwriting using an on-line handwriting recognition system or method.

Generally, on-line handwriting recognition systems or methods monitor the initiation of a stroke, such as when the user contacts a touch sensitive surface (pen-down); the termination of a stroke, such as when the user stops contacting a touch sensitive surface (pen-up); and any movements (gestures or strokes) the user makes with his or her finger or pen between the initiation and termination of the stroke.

On-line handwriting recognition systems or methods usually consist of a preprocessing stage, a segmentation stage, a recognition stage, and an interpretation stage. Generally, the preprocessing stage includes discarding irrelevant input data and normalizing, sampling, and removing noise from relevant data. The segmentation stage specifies the different ways to break down the input data into individual characters and words. The recognition generally includes a feature extraction stage, which characterizes the different input segments, and a classification stage which associates the segments with possible character candidates. Finally, the interpretation stage generally includes identifying the characters and/or words associated with the character candidates. In practice, on-line handwriting recognition systems or methods may include these stages along with additional stages. Further, on-line handwriting recognition systems or methods may not clearly delineate each stage.

On-line handwriting recognition systems or methods can be single-stroke or multi-stroke. Single stroke recognition uses single-stroke shorthand for each character of an alphabet (e.g., Palm, Inc.'s Graffiti). These systems or methods have less input errors but require users to memorize new stroke patterns for a whole alphabet. Multi-stroke recognition can recognize natural handwriting and is often necessary when using on-line handwriting recognition systems with languages that include characters that are not easily reduced to single strokes, such as Japanese or Chinese characters.

The type of computing device can also determine the type of handwriting recognition system or method utilized. For instance, if the input surface is large enough (such as a tablet), the user can input text or data anywhere on or above the input surface, as if the user was writing on a piece of paper. As devices become smaller, different systems or methods, such as multi-box or single-box, have been developed. Multi-box systems or methods divide the input surface into multiple areas, such as three boxes, where a user inputs each character in each box, one after another. These are advantageous because character segmentation becomes minimal or unnecessary. They also allow for multi-stroke characters, which can be analyzed with isolated-character recognition techniques.

For even smaller devices, the input surface may not be large enough for multiple boxes, so the surface is essentially a single-box writing interface. In this instance, only one character can be written at a time. Although single-box interfaces lend themselves to single-stroke recognition systems, certain languages, such as Japanese or Chinese, have multi-stroke characters that do not easily reduce to single-stroke shorthand. Further, most natural handwriting contains multi-stroke characters, regardless of the language.

Single-box interfaces using multi-stroke systems or methods create additional problems including determining the beginning and end of characters and clearly displaying the images of the input characters. One way to determine the beginning and end of characters requires the user to explicitly pause between each character. However, this is not optimal because it slows down the user from inputting data. In a single box system or method, where a user is able to input characters continuously and without a pause, input characters would be overlaid or superimposed on each other. This is referred to as superimposed handwriting, overlaid handwriting, or "on-top-writing."

The present on-line superimposed handwriting recognition system and method provides improved results for user input handwriting recognition by performing fragmentation and then segmentation, recognition, and interpretation concurrently, rather than sequentially. The present system and method performs fragmentation or classification of fragments to enhance recognition accuracy and speed. The present system and method performs segmentation, recognition, and interpretation at the same level rather than applying a hierarchy to the steps. By having segmentation, recognition, and interpretation occur collaboratively, the present system provides the user with the best possible character, word, and sentence candidates based on the user input.

SUMMARY

The examples of the present invention that are described herein below provide methods, systems, and software for use in on-line superimposed handwriting recognition. These permit a user to enter characters into a computing device using his or her natural handwriting without any explicit separation between characters. The present handwriting recognition system and method includes a computing device connected to an input device in the form of an input surface. A user is able to provide input by applying pressure to or gesturing above the input surface using either his or her finger or an instrument such as a stylus or pen. The present system and method monitors the input strokes.

The disclosed system and method provides an on-line handwriting recognition system and method that can interpret a user's natural handwriting style. This can be done by providing a system and method whereby a fragmentation expert detects the relative positions of the input strokes of at least sequential ones of the fragments, detects the geometry of the input strokes of the at least sequential fragments, determines from the detected relative positions the superimposition of segments of the input strokes and determining from the detected geometry whether the superimposed segments likely form a character, classifies the fragments based on the determined likely characters, and provides the classified fragments to a recognition engine for evaluation of character hypotheses based on the classified fragments.

Another aspect of the disclosed system and method provides the recognition engine with a segmentation expert, which creates a segmentation graph based on the user input and input from a recognition expert and language expert; the recognition expert, which associates a list of character candidates with recognition scores of each node of the segmentation graph; and the language expert, which generates linguistic meaning of the different paths in the segmentation graph, all work collaboratively through dynamic programming.

In another aspect of the disclosed system and method after preprocessing the input strokes, the fragmentation expert, the segmentation expert, recognition expert, and language expert analyze the input data. The segmentation, recognition and language experts work simultaneously and collaboratively through dynamic programming to process input strokes and generate candidates at the character, word, and sentence level.

Another aspect of the disclosed system and method provides an on-line handwriting recognition system and method that can recognize superimposed handwriting, where characters are written one over another without any explicit separation between consecutive letters. This can be done by providing a system and method whereby the segmentation expert, recognition expert, and language expert work collaboratively through dynamic programming to provide the most likely candidates for character, word, and sentence inputs.

Yet another aspect of the disclosed system and method provides an on-line handwriting recognition system and method that can recognize multiple-stroke characters. This can be done by providing a system and method whereby the segmentation expert creates a segmentation graph that is based on the user input and the dynamic programming that involves the recognition and language experts analyzing the segmentation graph.

Another aspect of the disclosed system and method provides an on-line handwriting recognition system and method that can recognize cursive writing where attached characters are written one over the other. This is done by providing a system and method whereby the segmentation expert detects particular points defining locations for breaking a stroke into its constituting segments.

A further aspect of the disclosed system and method provides an on-line handwriting recognition system and method that provides word boundaries based on either a specific input stroke or by automatically detecting word boundaries. This is done by providing a system and method whereby the present system including the segmentation expert, recognition expert, and language expert all expect a specific input stroke to break up input characters into words; or the three experts automatically add word breaks by analyzing all the input characters holistically.

The present system and method will be more fully understood from the following detailed description of the examples thereof, taken together with the drawings.

BRIEF DESCRIPTION OF THE DRAWINGS

FIG. 4 shows a schematic pictorial of a possible user input of cursive user input in accordance with an example of the present system.

FIG. 5 shows schematic pictorial illustration of the segmentation of a cursive user input in accordance with an example of the present system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies described herein generally relate to on-line handwriting recognition and more specifically to systems and methods for superimposed handwriting recognition on various computing devices. The system and method described herein may be used to recognize a user's natural handwriting input through the concurrent processes of segmentation, recognition, and interpretation to provide the best possible character, word, and sentence candidates.

Figure 1:
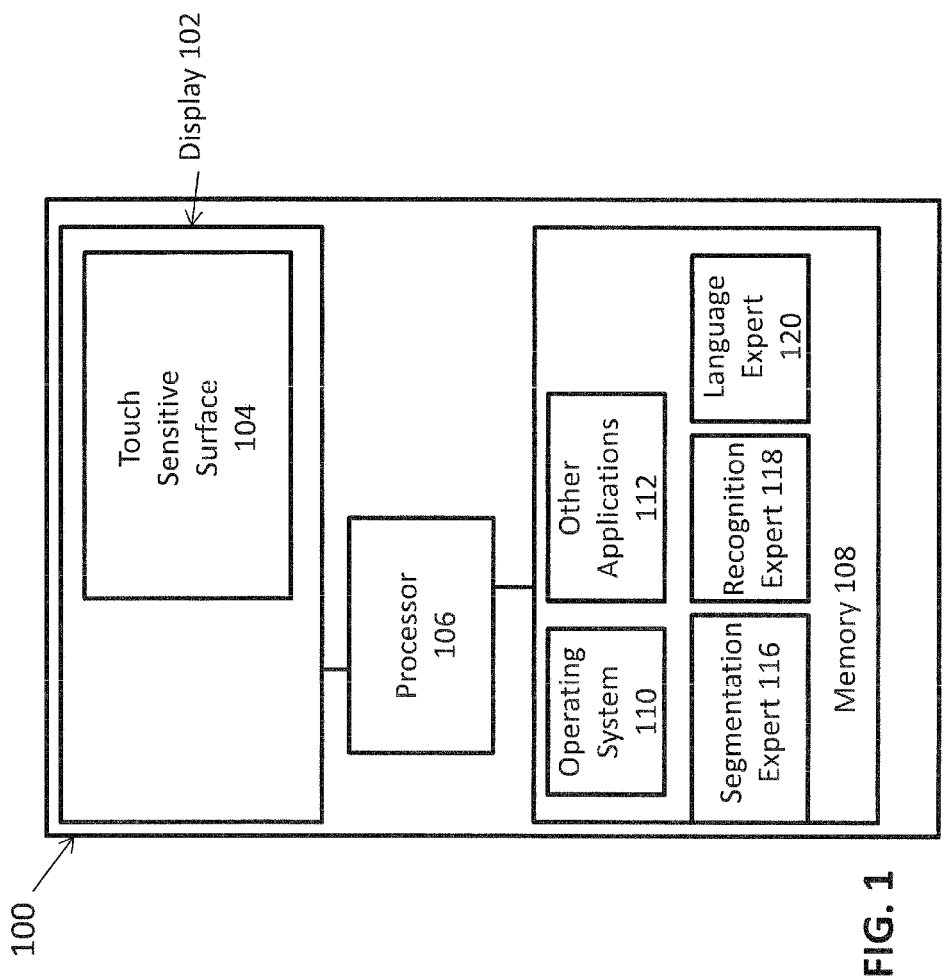
FIG. 1 shows a block diagram of a computing device in accordance with an example of the present system.

FIG. 1 shows a block diagram of a computing device 100. This computing device can be a computer desktop, laptop, tablet PC, e-book reader, mobile phone, smartphone, wearable computer, digital watch, global positioning system (GPS) unit, enterprise digital assistant (EDA), personal digital assistant (PDA), or game console. The device 100 includes at least one processing element, some form of memory and input and/or output (I/O) devices. The components communicate with each other through input and output means, such as connectors, lines, buses, cables, buffers, electromagnetic links, networks, modems, transducers, IR ports, antennas, or other means as known to those of ordinary skill in the art.

The device 100 includes at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art. The input surface 104 may be bounded by a permanent or video-generated border that clearly identifies its boundaries.

In addition to the input surface 104, the device 100 may include one or more additional I/O devices (or peripherals) that are communicatively coupled via a local interface. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

One such I/O device may be at least one display 102 for outputting data from the computing device such as images, text, and video. The display 102 may use LCD, plasma, CRT, or any other appropriate technology as known to those of ordinary skill in the art. At least some of display 102 could be co-located with the input surface 104. Other additional I/O devices may include input devices such as a keyboard, mouse, scanner, microphone, touchpads, bar code readers, laser readers, radio-frequency device readers, or any other appropriate technology as known to those of ordinary skill in the art. Furthermore, the I/O devices may also include output devices such as a printer, bar code printers, or any other appropriate technology as known to those of ordinary skill in the art. Finally, the I/O devices may further include devices that communicate both inputs and outputs such as a modulator/demodulator (modem; for accessing another device, system, or network), a radio frequency (RF) or other transceiver, a telephonic interface, a bridge, a router, or any other appropriate technology as known to those of ordinary skill in the art.

The device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, SDRAM, etc.)) and nonvolatile memory elements (e.g., ROM, EPROM, flash PROM, EEPROM, hard drive, magnetic or optical tape, memory registers, CD-ROM, WORM, DVD, redundant array of inexpensive disks ("RAID"), another direct access storage device ("DASD"), etc.). Moreover, memory 108 may incorporate electronic, magnetic, optical, and/or other types of storage media. The memory 108 can have a distributed architecture where various components are situated remote from one another but can also be accessed by the processor 106. The memory 108 is coupled to a processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in memory 108 includes the on-line handwriting computer program, which may include one or more separate programs, each of which comprises an ordered listing of executable instructions for implementing logical functions. The operating system 110 controls the execution of the on-line handwriting computer program. The operating system 110 may be a proprietary operating system or a commercially available operating system, such as PALM®, WINDOWS®, MAC and IPHONE OS®, LINUX, ANDROID, etc. It is understood that other operating systems may also be utilized without departing from the spirit of the system and method disclosed herein.

The memory 108 may include other application programs 112 related to handwriting recognition as described herein, totally different functions, or both. The applications 112 include programs provided with the device 100 upon manufacture and may further include programs downloaded into the device 100 after manufacture. Some examples include a text editor, telephone dialer, contacts directory, instant messaging facility, email program, word processing program, web browser, camera, etc.

The on-line handwriting recognition computer program with support and compliance capabilities may be a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system. Furthermore, the on-line handwriting recognition computer program with support and compliance capabilities can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The system is initiated when processor 106 detects a user entered stroke via the input surface 104. The user may enter a stroke with a finger or some instrument such as a pen or stylus. A stroke is characterized by at least the stroke initiation location, the stroke termination location, and the path upon which the user connects the stroke initiation and termination locations. Because different users may naturally write the same letter with slight variations, the present system accommodates a variety of ways in which each letter may be entered.

Figure 2:
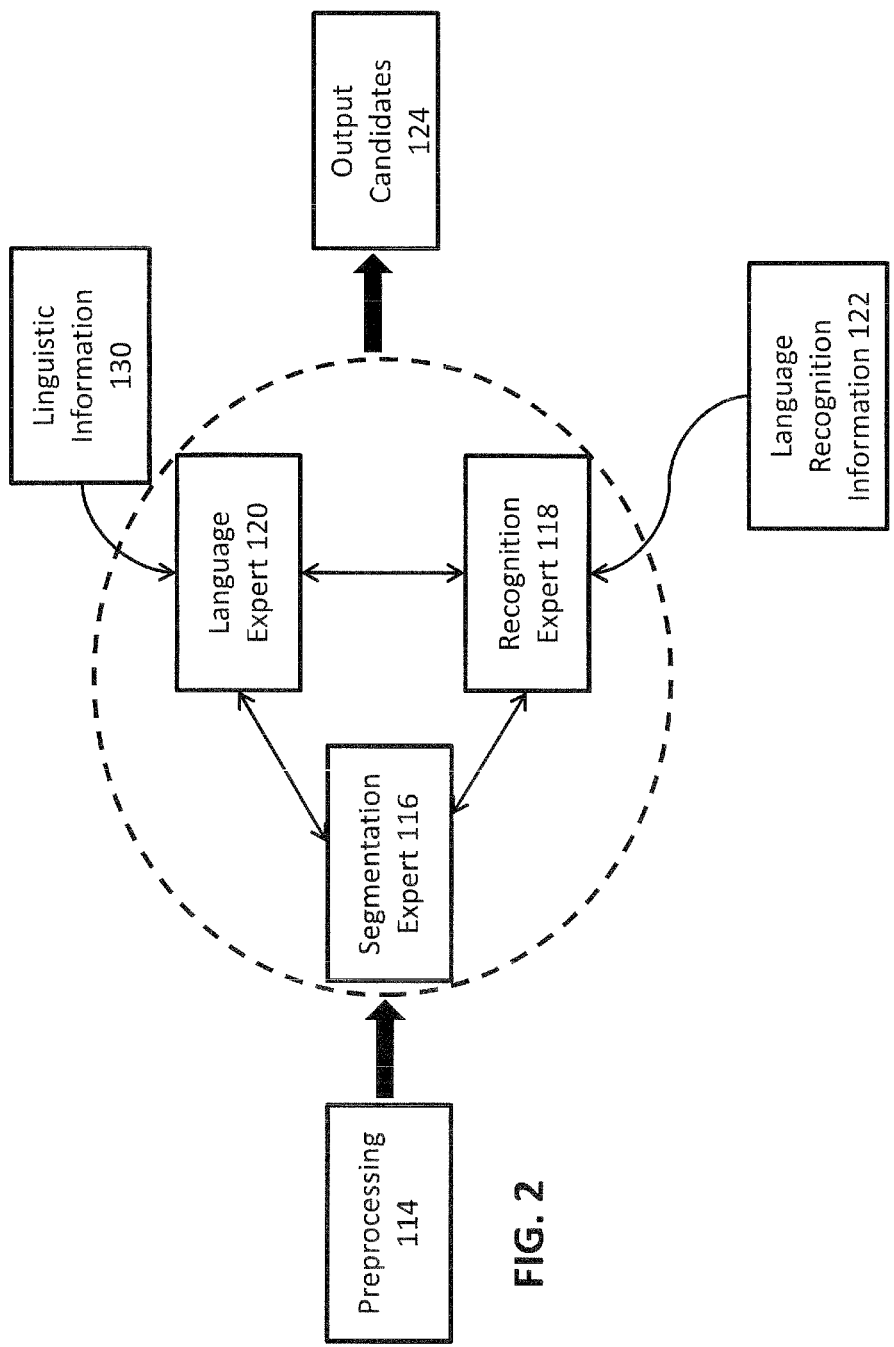
FIG. 2 shows a block diagram of a system for on-line handwriting recognition in accordance with an example of the present system.

FIG. 2 is a schematic pictorial of a system for on-line handwriting recognition in accordance with an example of the present system. Once initiated with at least one input stroke, the system preprocesses 114 the strokes. Preprocessing 114 can include normalizing the path connecting the stroke initiation and termination locations by applying size normalization and/or methods such as B-spline approximation to smooth the input. The input stroke is then passed to three experts (segmentation expert 116, recognition expert 118, and language expert 120) that collaborate through dynamic programming to generate output candidates 124 at the character, word, and sentence level.

Figure 3B:
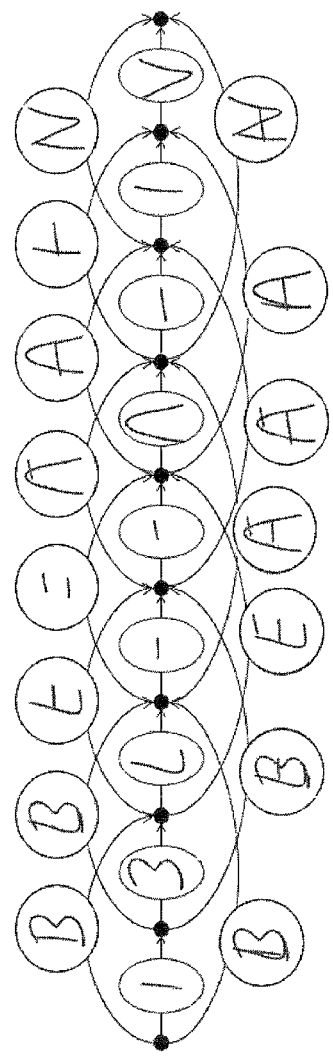
FIG. 3B shows a schematic pictorial of a segmentation graph in accordance with an example of the present system.
Figure 3A:
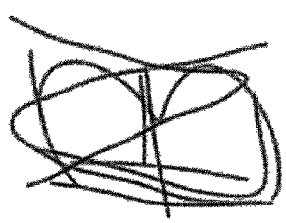
FIG. 3A shows a pictorial illustration of a possible user input in accordance with an example of the present system.

The segmentation expert 116 defines the different ways to segment the input strokes into words and individual character hypotheses. To form the character hypotheses, the segmentation expert 116 groups consecutive strokes of the original input. This results in a segmentation graph where each node corresponds to at least one character hypothesis and where adjacency constraints between characters are handled by the node connections. Nodes are considered adjacent if the corresponding hypotheses have no common stroke but whose strokes are consecutive in the original input. FIG. 3A shows a possible user input of the word BEAN in accordance with an example of the present system. Specifically, the figure displays an example of superimposed writing with multi-stroke characters. FIG. 3B shows a possible segmentation graph of the input of FIG. 3A created in accordance with an example of the present system.

Superimposed handwriting recognition systems and methods must also determine where one word ends and another begins. The present system and method is capable of multiple embodiments to retrieve word boundaries. In one embodiment, a user is required to insert a specific gesture after each word. In this embodiment, the specific gesture is output as a space character. This embodiment brings more robustness to the segmentation process since it reduces the different ways to segment the input strokes into words and individual character hypotheses. However, this embodiment forces the user to add a specific gesture indicating the end of each word, which might be missed by some users.

An alternative embodiment does not require a specific gesture separating words. Instead, the on-line handwriting recognition computer program automatically detects word boundaries with the help of the recognition expert 118 and/or language expert 120, which will be described in detail below. For instance, the language expert 120 uses linguistic information 130 to retrieve the word boundaries based on, among other things, lexical knowledge and techniques modeling the likelihood of a sequence of consecutive words in a given language, such as N-grams models, syntactic parsing, semantic analysis, etc.

For example, a user may enter the character sequence "whattimeisit?" with superimposed writing in an embodiment based on linguistic information 130 extracted from the English language. This alternative embodiment would output the word segmentation "what time is it?" making a global meaning to the input strokes and retrieving the word boundaries based on the linguistic information 130. This embodiment has the advantage of allowing the user to input a sequence of words without inserting a specific gesture between each word.

In another embodiment, the two previous methods can be combined. In that case, the user can insert a specific gesture after each word for getting more robustness to detect word boundaries. But whenever the user neglects to insert a gesture, the handwriting recognition system is able to detect word boundaries with the help of the recognition expert 118 and/or language expert 120.

Figures 4, 5:
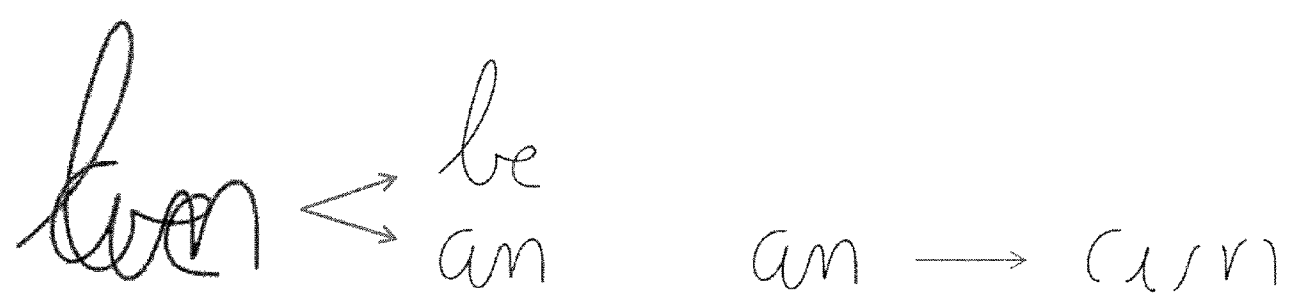

In one example, the segmentation expert is not limited to handprint writing input where each individual character is separated from its neighbor characters with a pen-up, as seen in FIGS. 3A and 3B. The segmentation expert 116 of the present system is also able to process cursive writing where attached characters are written one over the other. FIG. 4 illustrates a cursive user input of words "be" and "an." When interpreting cursive user input, the segmentation expert 116 segments each stroke based on a detection of particular points defining locations for breaking a stroke into its constituting segments. FIG. 5 illustrates an example of a cursive "an" being broken up into its constituting segments. The particular points for breaking a stroke into its constituting segments may be defined by crossing points, a change in the slope of stroke path, etc. These constituting segments are used to construct the segmentation graph.

Figure 6:
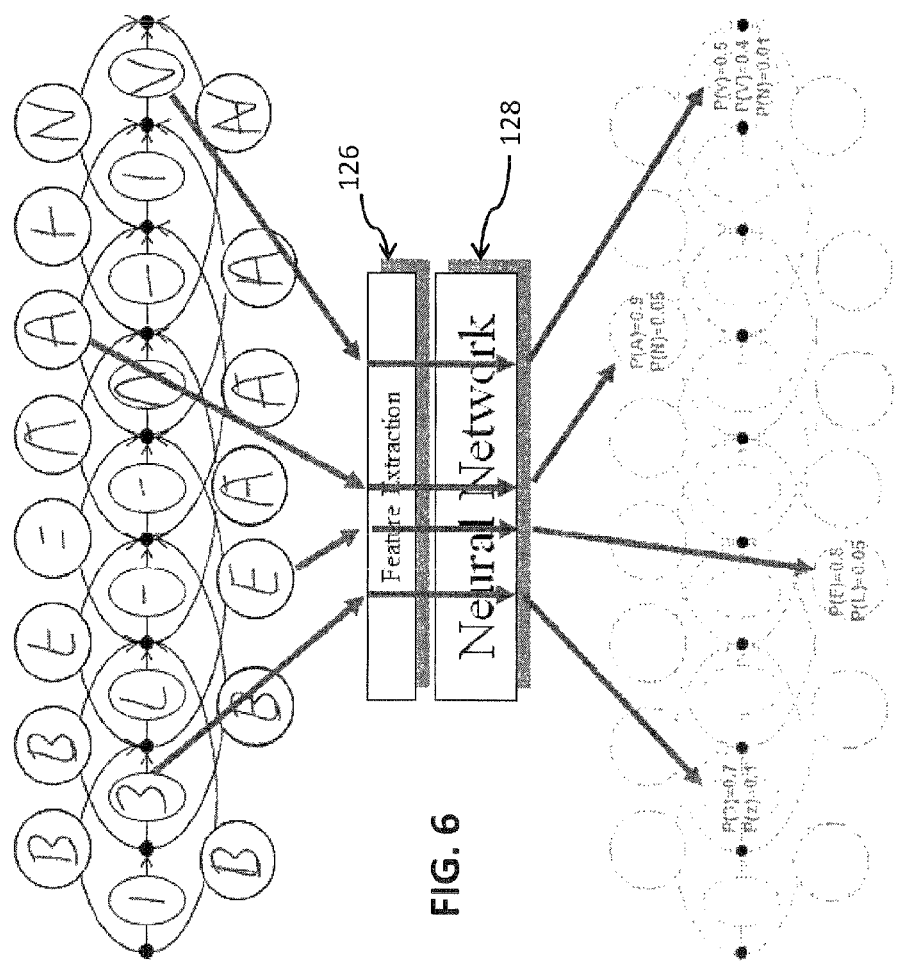
FIG. 6 shows a schematic pictorial illustration of the recognition expert in accordance with an example of the present system.

The recognition expert 118 associates a list of character candidates with probabilities or recognition scores for each node of the segmentation graph. These probabilities or recognition scores are based on the language recognition information 122. The language recognition information defines all the different characters and symbols of the alphabet underlying to the specified language. This information is language dependent and comprises general differences in alphabets as well as the ability to recognize various individual styles of writing the alphabets. For instance, the way an individual writes a "7" can be quite different depending on whether that individual is from the USA, France, or even Korea. Continuing the example given in FIGS. 3A and 3B, FIG. 6 illustrates an embodiment of the recognition expert 118 that includes two stages. The first stage of the recognition expert 118, feature extraction 126, is based on a combination of dynamic and static features. For instance, the dynamic features can be extracted from the trajectory of the input stroke and are based on information such as position, direction, and curvature of the input stroke. Static features can be extracted from a bitmap representation of the input stroke and can be based on projections and histograms.

The second stage of the recognition expert 118 of the present embodiment is classification of the features extracted by a pattern classifier such as Neural Networks 128. In the present embodiment, the Neural Networks can be simple multilayer perceptrons. The Neural Networks can also include an extra class enabling the Neural Network to reject node hypotheses corresponding to badly segmented characters. The recognition expert 118 outputs a list of character candidates with probabilities or recognition scores for each node of the segmentation graph. An alternative embodiment might make use of another kind of Neural Network such as Deep Neural Network, Convolutional Neural Network, or Recurrent Neural Network. More generally, any kind of pattern classifier could be used to address this recognition task (e.g., Support Vector Machine, Hidden Markov Model).

Figure 7:
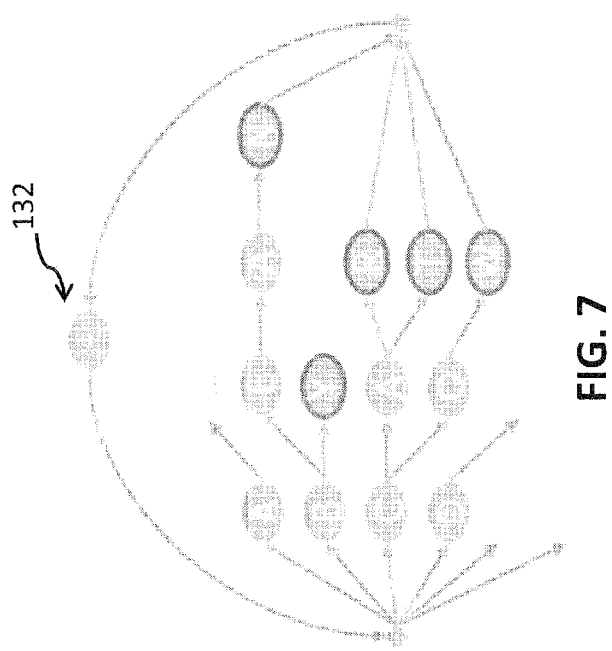
FIG. 7 shows a schematic pictorial illustration of a linguistic automaton in accordance with an example of the present system.

The language expert 120 generates linguistic meaning for the different paths in the segmentation graph. It checks the candidates suggested by the other experts according to the linguistic information 130 available. This linguistic information 130 can include a lexicon, regular expressions, etc. The language expert 120 aims at finding the best recognition path. In one embodiment, the language expert 120 does this by exploring a language model such as final state automaton (determinist FSA) representing the content of linguistic information 130. FIG. 7, building on examples in FIGS. 3A, 3B, and 6, shows a linguistic automaton with a lexicon that only contains the words BEAN, BY, CAR, CAT, and COW. Further, FIG. 7 represents an embodiment of the language expert that expects the user to insert a dash 132 to define a word boundary.

In addition to the lexicon constraint, the language expert 120 may use statistical information modeling for how frequent a word or a given sequence of words appears in the specified language or is used by a specific user. For instance, a word tri-gram language model may be used to evaluate the linguistic likelihood of the interpretation of a given path of the segmentation graph.

The segmentation expert 116, recognition expert 118, and language expert 120 work collaboratively through dynamic programming to process input strokes and generate output candidates 124 at the character, word, and sentence level. In one embodiment, the dynamic programming is based on a beam search technique that searches for the best path both in the segmentation graph and the linguistic model. In this instance, the best path is the path corresponding to the lowest cost. The lowest cost path could be defined as the sum of:

- Costs of all the character candidates encountered in the corresponding path into the segmentation graph. These costs can be estimated from the probabilities or recognition scores of each node belonging to this path in the segmentation graph. In one embodiment, the costs are estimated from the Neural Network probabilities by applying a −log non-linear function.
- Costs of all words encountered in the corresponding path of the linguistic model. Those costs can be estimated from the N-gram probabilities from the language expert 120. In one embodiment, the costs are estimated from the N-gram probabilities from the language expert 120 by applying a −log non-linear function.

For overall training of the present on-line handwriting recognition computer program, a global discriminant training scheme at the text level with automatic learning of all parameters of the classifiers (e.g., Neural Network) 128 and any meta-parameters of the system may be used, although other training systems and methods may be used. Through the present on-line superimposed handwriting recognition system and method, the best results for user input handwriting recognition are provided by performing segmentation, recognition, and interpretation concurrently, rather than sequentially or in a hierarchal nature.

Figure 8:
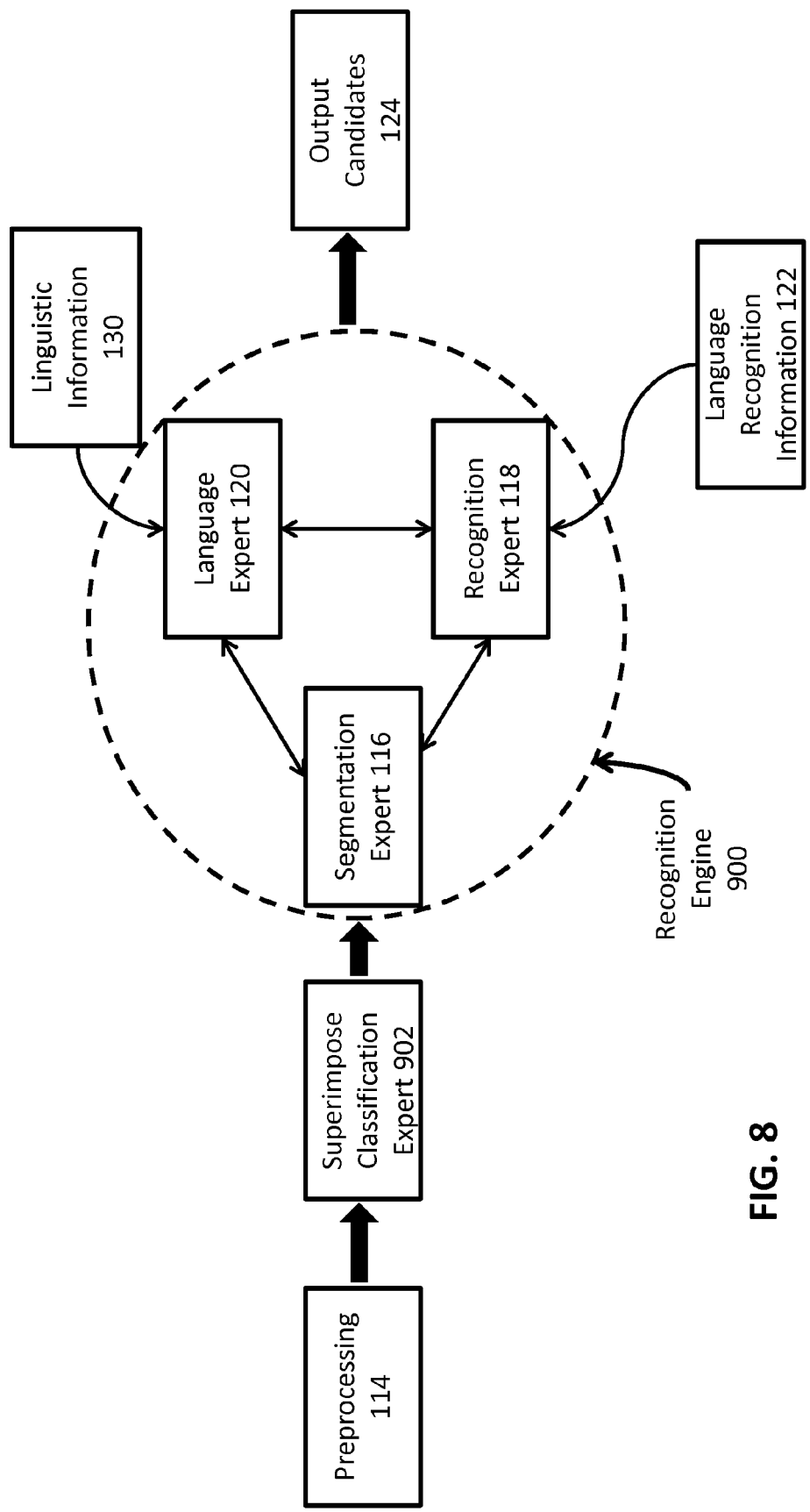
FIG. 8 shows a block diagram of a system for on-line handwriting recognition in accordance with a further example of the present system.

As discussed in relation to FIG. 4, the segmentation expert 116 of the present system is able to process cursive writing where multiple, attached characters, rather than single characters, are written one over the other as input. FIG. 8 is a schematic pictorial of a system for on-line handwriting recognition in accordance with a further example of the present system. This further example system, like the system example of FIG. 2, preprocesses 114 the strokes which are ultimately passed to the segmentation expert 116, recognition expert 118, and language expert 120 that collaborate to generate output candidates 124 at the character, word, and sentence level. The segmentation expert 116, recognition expert 118, and language expert 120 together form at least a part of a recognition engine 900. In order to present the preprocessed 114 strokes to the recognition engine 900 for efficient recognition processing of cursive input, the system of the present example further employs superimpose classification 902 of the preprocessed 114 input which classifies the superimposition of cursive, and non-cursive, characters within the input and passes this classified input to the recognition engine 900. It is understood that like reference numerals depict elements having like functional and structural characteristics.

Operation of the superimpose classification expert 902 is now discussed with reference to FIGS. 8-10. Cursive user input contains attached characters, where all or only some of the characters are attached. When inputting handwriting in a superimposed manner, the writing of words and sentences is performed by overlaying a plurality of fragments of those words and sentences in the same space of the input surface in a time-wise manner, e.g., the fragments occupy at least some of the same space at different times. Each fragment may contain one or more complete characters, e.g., letters, which combined with the characters of preceding and/or proceeding fragments make up complete words. However, as discussed later, each fragment may also contain one or more incomplete characters, e.g., a first fragment may contain the root of the letter "t" or "i", for example, and a second (next) fragment may contain the 'bar' of the letter "t" or the 'dot' of the letter "i", which combined with incomplete characters of preceding and/or proceeding fragments make up complete characters, which presents unique challenges to classifying the fragments.

Such superimposition clearly leads to many possible interpretations of the input with consequences on processing time and accuracy of the recognition engine. The present system however uses the mechanism of this superimposed input to improve processing time through reduction of the number of hypotheses to be tested by the recognition engine and improve processing accuracy through constraint of available hypotheses to those that are likely valid. This may be achieved as follows.

Figure 9A:
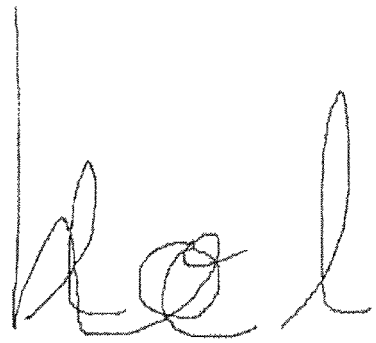
FIG. 9A shows a pictorial illustration of a possible user input in accordance with an example of the present system.
Figure 9B:
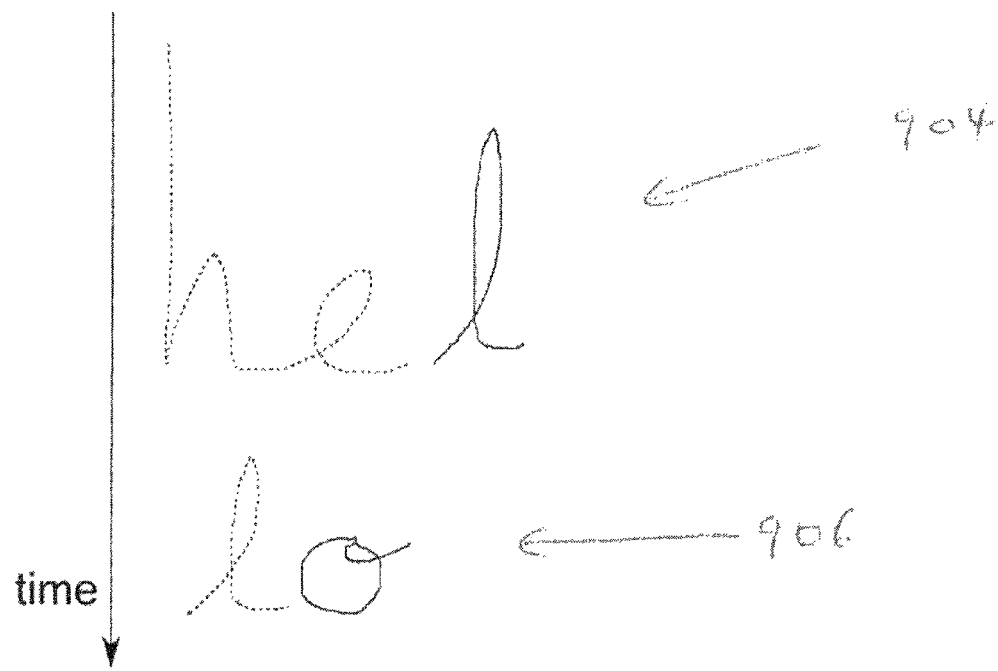
FIG. 9B shows a pictorial illustration of the timing of the user input of FIG. 9A.

FIG. 9A illustrates a cursive user input of the word "hello" as a superimposed input of fragments "hel" and "lo". FIG. 9B illustrates this input in time-wise fashion. As can be seen, a first fragment 904 contains the complete characters "h" and "e" attached to one another in cursive script (e.g., written or input as a single stroke) and the complete character "l" in cursive script but isolated (e.g., separated or un-attached) from the other characters. Further, a second fragment 906 contains the complete characters "l" and "o" in cursive script but isolated from one another. This is merely an example, and all or none of the characters may be attached and/or in cursive script. In the earlier-described example of the present system, the recognition engine segments all characters in both fragments to develop a segmentation graph allowing the processing of many hypotheses without regard to the fragments themselves. In the present example, the superimpose classification expert 902 is configured to process the input with regard to the fragments to limit the number of hypotheses that can be generated, and therefore tested, by the recognition engine 900, thereby reducing the processing time and enhancing the recognition accuracy.

The superimpose classification expert or classifier 902 detects whether the current stroke of the input is at the beginning of a new fragment based, at least in part, on the geometry of the current and adjacent strokes and classifies the strokes accordingly. For example, in FIG. 9B the 'stroke' which forms the attached characters "he" in the first fragment (shown in dashed line) are detected by the classifier 902 as the beginning of a fragment and the 'stroke' which forms the isolated character "l" in the second fragment (shown in dashed line) is detected by the classifier 902 as the beginning of another fragment. The classifier 902 thereby classifies the input in two classified fragments and knows which strokes of the input belong to which classified fragments and in consideration of the time information of the input of the strokes the classifier can classify the final stroke forming the character "l" in the first classified fragment is not part of the stroke forming the first character "l" in the second, subsequent classified fragment. This classification is parsed to the recognition engine 900, so that the segmentation expert 116 already knows the break points of these particular strokes for segmentation and recognition processing.

In order to detect the beginning of a fragment, the classifier 902 uses spatial, temporal and geometrical information of the input strokes, rather than just one of these pieces of information or rather than just pen-up and pen-down information. That is, if just temporal information was used, then the recognition engine would be forced to either make assumptions as to stroke segmentation based on time or develop hypotheses for all strokes regardless of fragmentation because there would be no way of knowing if a latter stroke and an immediately former stroke belong to the same character or not. Further, if just pen-up and pen-down information was used to determine fragmentation (as in the case of a single character superimpose input method) then the pen-up and pen-down event between the "he" and "l" in the first fragment 904 would be interpreted as a fragmentation event, which is clearly inaccurate. Further, if just spatial information was used to determine fragmentation, e.g., detecting when the pen-down position is to the left of the immediately previous pen-up position in the case of left to right character input as in the depicted examples (it is understood that input in other directions, e.g., right to left, up to down, etc., are also applicable) then incomplete characters would never be married by the recognition engine leading to inaccurate recognition.

Figure 10A:
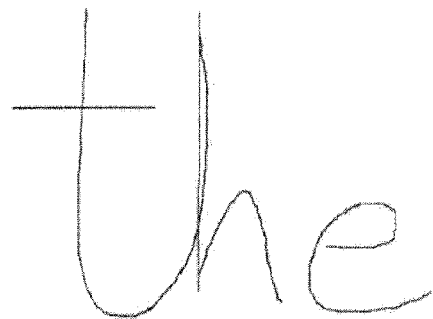
FIG. 10A shows a pictorial illustration of a possible user input in accordance with an example of the present system.
Figure 10B:
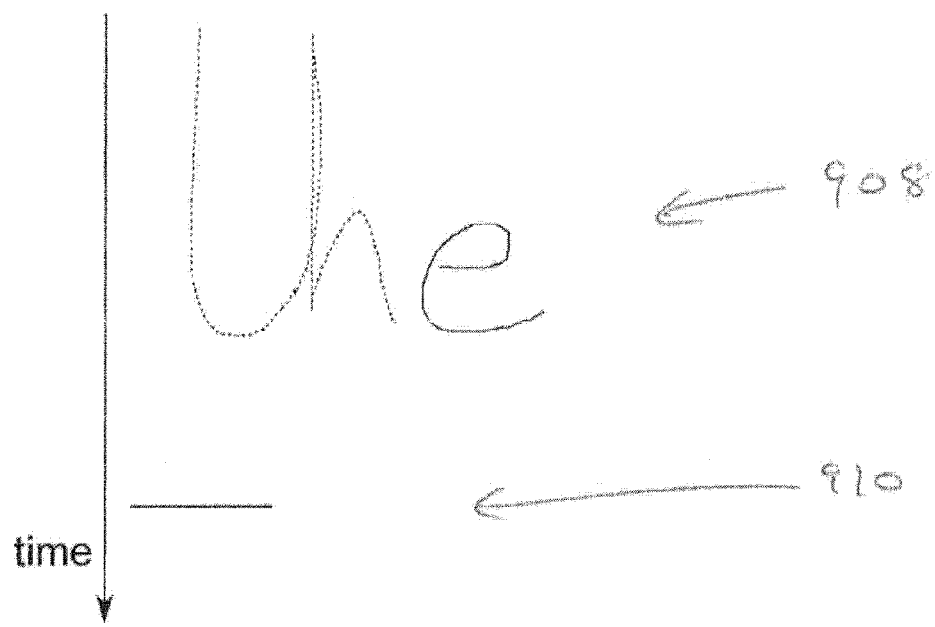
FIG. 10B shows a pictorial illustration of the timing of the user input of FIG. 10A.

FIG. 10A illustrates a cursive user input of the word "the" as a superimposed input of fragments "lhe" and "-". FIG. 10B illustrates this input in time-wise fashion. As can be seen, a first fragment 908 contains the characters "l" and "h" attached to one another in cursive script and the character "e" isolated therefrom in cursive script, and a second fragment 910 contains the complete character "-". This is merely an example, and all or none of the characters may be attached and/or in cursive script. Clearly, in this input the delayed stroke "-" of the second fragment is intended as the 'bar' of the "t" in the first fragment. However, if the classifier 902 classified the fragments (e.g., fragmented) this input based on temporal, spatial or pen-up pen-down behavior only, the delayed stroke "-" would be classified as the beginning of a new classified fragment and hence the recognition engine 900 would be caused to evaluate two hypotheses: "lhe -" and "lhe-" where neither of these reflect the user's input, leading to inaccurate recognition. The classifier 902 however uses the geometry of the strokes together with the spatial (and temporal) information to classify the strokes into fragments. The temporal information provides knowledge of the time order of input strokes. The spatial information used not only provides knowledge of the relative positions of the last stroke in a previous fragment and the first stroke of a next fragment which indicates a superimposed input event but also provides knowledge of the relative positions of all strokes within these fragments. The geometrical information allows the classifier 902 to consider whether the superimposed strokes likely belong to a single character or not, e.g., that possible incomplete characters in adjacent or proximate fragments together form complete characters in any one of those fragments.

That is, in the example of FIG. 10B, the classifier 902 detects based on spatial (and temporal) information that the delayed stroke "-" has a relative position to the stroke "lhe" which means that the stroke "-" overlays the stroke segment "l" of the complete stroke "lhe", and the classifier 902 detects based on the geometrical information of these overlaid strokes may be combined to produce a likely single or complete character. As a result, the superimpose classification expert 902 does not classify the delayed stroke as the beginning of a new fragment (i.e., the stroke "-" is not shown in dashed line in FIG. 10B whilst the stroke "lh" is) but provides a single classified fragment to the recognition engine, thereby causing the recognition engine to evaluate the two hypotheses: "the" and "lhe-", which will clearly lead to an accurate recognition result. In this way, the superimpose classification engine 902 implements a rule that a classified fragment contains complete characters only, and adjacent or proximate fragments of input digital ink containing incomplete characters, as defined by the known geometrical information, are to be classified as single classified fragments.

A further possible criteria for fragmentation or classifying fragments is the presence of spaces between characters. However, without further criteria, this may lead to inaccurate and time-costly recognition. This is because, depending on the size of the input surface (e.g., the width of the device for handwriting input) it is possible that longer strings of input characters than those illustrated with spaces between words can be input in superimposed fashion or mode, i.e., fragments of words, sentences and paragraphs are superimposed on one another. In such case, spaces between characters are part of the input to be recognized rather than indicators of input fragments. On the other hand, the detection and classification of a new fragment by the classifier may be used to cause the recognition engine to include a hypothesis of a space between the last and first characters of adjacent classified fragments in the evaluation of possible hypotheses.

Whilst the description of the example of FIGS. 8-10 has been made with respect to multiple characters entered in each superimposed fragment in cursive script, it is understood by those skilled in the art that the use of geometrical and spatial information, or geometrical, spatial and temporal (and/or pen-up pen-down) information could be used to classify strokes of single or multiple non-cursive, e.g., print, characters into fragments. Further, the classifier may be considered to be configured to provide a default classification that treats all strokes as belonging to the same fragment until an event is detected that is likely generation of a new fragment, however it is understood by those skilled in the art that the superimpose classifier could use the combined stroke information to provide a default classification that treats superimposed strokes as belonging to different fragments unless exceptions are detected, such as completion of incomplete strokes. In order to apply geometrical information, the classifier 902 may refer to a database, list, table, or lexicon, etc., of stroke shapes and their relation to one another with respect to likely characters stored by memory of classifier or the system. Further, the superimpose classification expert may be configured to compare the relative geometrical and positional (and temporal) information of immediately subsequent, immediately sequential, or directly adjacent fragments only, or of a series of sequential or successive input fragments in order to classify the fragments. For example, if in three successive input fragments say, if the classifier detected that the first and third fragments likely contain incomplete characters which combined make a complete character, e.g., the root 'l' of a "t" in the first fragment and the bar '-' of the "t" in the third fragment, the classifier could use this information to classify a single fragment containing the strokes of all three input fragments.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

What is claimed is:

1. A non-transitory computer readable medium having computer readable program code embodied therein, said computer readable program code adapted to be executed to implement a method for providing handwriting recognition for a plurality of fragments of input strokes at least partially superimposed on one another, said method comprising:
   detecting relative positions of input strokes of at least two sequential fragments of the input strokes;
   detecting the geometry of the input strokes of the at least two sequential fragments;
   determining from the detected relative positions the superimposition of segments of the input strokes and determining from the detected geometry whether the superimposed segments likely form a character;
   classifying the fragments based on the determined likely characters; and
   providing the classified fragments to a recognition engine for evaluation of character hypotheses based on the classified fragments,
      wherein, within the recognition engine, the method comprises:
      creating a segmentation graph based on the strokes of the classified fragments, wherein the segmentation graph consists of nodes corresponding to character hypotheses;
      assigning a recognition score to each node of the segmentation graph based on a pattern classifier;
      generating linguistic meaning of the input strokes based on the recognition scores and a language model; and
      providing an output based on the simultaneous analysis of the segmentation graph, the recognition score, and the language model.

2. A non-transitory computer readable medium according to claim 1, wherein the input strokes are preprocessed, wherein the preprocessing includes at least the normalization and smoothing of the input strokes.

3. A non-transitory computer readable medium according to claim 1, wherein each classified fragment is defined to contain complete characters formed by the input strokes of one or more input fragments.

4. A method for providing handwriting recognition for a superimposed input stroke, said method comprising:
   detecting relative positions of input strokes of at least two sequential fragments of the input strokes;
   detecting the geometry of the input strokes of the at least two sequential fragments;
   determining from the detected relative positions the superimposition of segments of the input strokes and determining from the detected geometry whether the superimposed segments likely form a character;
   classifying the fragments based on the determined likely characters; and
   providing the classified fragments to a recognition engine for evaluation of character hypotheses based on the classified fragments,
      wherein, within the recognition engine, the method comprises:
      creating a segmentation graph based on the strokes of the classified fragments, wherein the segmentation graph consists of nodes corresponding to character hypotheses;
      assigning a recognition score to each node of the segmentation graph based on a pattern classifier;
      generating linguistic meaning of the input strokes based on the recognition scores and a language model; and
      providing an output based on the simultaneous analysis of the segmentation graph, the recognition score, and the language model.

5. A method according to claim 4, wherein the input strokes are preprocessed, wherein the preprocessing includes at least the normalization and smoothing of the input strokes.

6. A method according to claim 4, wherein each classified fragment is defined to contain complete characters formed by the input strokes of one or more input fragments.

7. A non-transitory computer readable medium according to claim 1, wherein the detected relative positions of the input strokes of the at least sequential fragments are detected from both spatial and temporal information of the input strokes.

8. A non-transitory computer readable medium according to claim 1, wherein the segmentation graph further includes nodes corresponding to space hypotheses between the character hypotheses based on the classified fragments.

9. A method according to claim 4, wherein the detected relative positions of the input strokes of the at least sequential fragments are detected from both spatial and temporal information of the input strokes.

10. A method according to claim 4, wherein the segmentation graph further includes nodes corresponding to space hypotheses between the character hypotheses based on the classified fragments.

* * * * *